Figure 1:
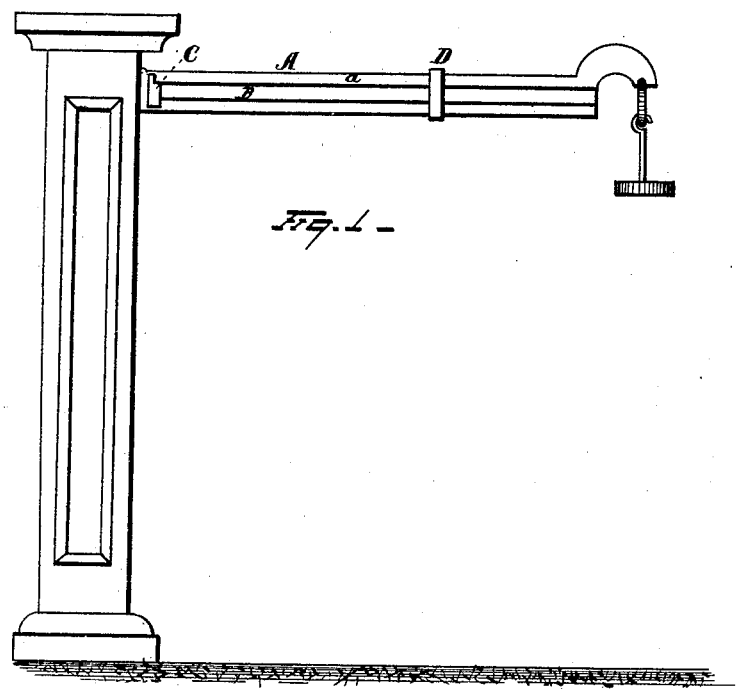

2 Sheets—Sheet 1.

O. HUFFMAN.
GRAIN CALCULATOR.

No. 176,432. Patented April 25, 1876.

WITNESSES
E. S. Nottingham
Albert W. Bright

INVENTOR
Orlando Huffman.
By Leggett & Leggett,
Attorneys.

2 Sheets—Sheet 2.
O. HUFFMAN.
GRAIN CALCULATOR.
No. 176,432. Patented April 25, 1876.
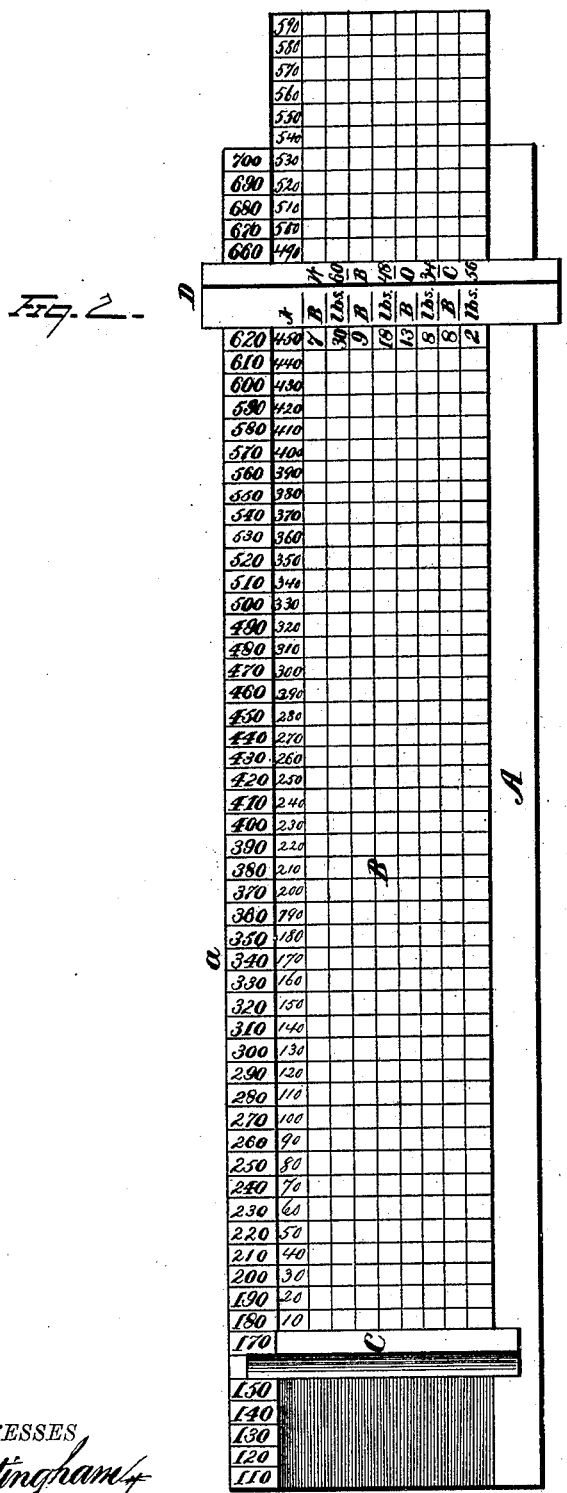
WITNESSES
E. I. Nottingham
Albert H. Bright
INVENTOR
Orlando Huffman
By Leggett & Leggett
Attorneys.

UNITED STATES PATENT OFFICE.

ORLANDO HUFFMAN, OF FRIEND, NEBRASKA, ASSIGNOR OF ONE-HALF HIS RIGHT TO BAILEY G. McKINZIE, OF SAME PLACE.

IMPROVEMENT IN GRAIN-CALCULATORS.

Specification forming part of Letters Patent No. 176,432, dated April 25, 1876; application filed February 19, 1876.

*To all whom it may concern:*

Be it known that I, ORLANDO HUFFMAN, of Friend, in the county of Saline and State of Nebraska, have invented certain new and useful Improvements in Grain-Calculators; and I do hereby declare the following to be a full, clear, and exact description of the invention, such as will enable others skilled in the art to which it pertains to make and use it, reference being had to the accompanying drawings, which form part of this specification.

My invention has relation to mechanical means for lessening and obviating the mental effort incident upon the ordinary mode of computing the measurement of different articles, such as grains, vegetables, coal, &c., but with especial reference to the former—grain. When a given weight is found to be the scales' balance for a load of any cereal, including carriage, bagging, and all, it is apparent that the net or true weight of the commodity will be such gross weight minus the weight of the attending and carrying conveyance; but even with this true weight given, or readily ascertained, it is still a matter of time and difficulty to reduce or change the answer from the scale of pounds to that of bushels, the market-standard for valuation, and all rating as to storage, shipment, &c. The "remainder," then, as determined in the first process—subtraction—must be divided by the number of pounds which form a bushel of that special article, said divisor varying for and corresponding to each individual variety of grains.

My invention consists in a simple device for at once and accurately ascertaining the measurement of commodities, as aforesaid, by a mere manual movement, and may be said to be of a three-part nature: first, a body or main support, on the side of which is arranged, in consecutive numerical order, a series of figures in any desired progressive ratio; secondly, a face-plate sliding in grooves, and a channel, whereby its upper surface is approximately flush with that of the figured side, as before mentioned, which plate is provided with any number of rows of figures, set off as hereafter described; thirdly, a slide or cross bar, traveling the length of the two foregoing, and having in full view indices, either of letter or otherwise, arranged so that they may be above and correspond to the different rows of figures on the central plate, and is a register of each different grain.

In the drawings, Figure 1 is a view of my calculator attached to a weighing-scale. Fig. 2 shows it in detail.

The principal object will be its use in close proximity to a scale, though it may be used apart from same, and as a convenient article for the counting-desk. The description will, however, treat of it as attached to a scale, in which A is the beam of any scale, with its upper side *a* figured, as is usual, according to any progressive proportion. B is the central plate, longitudinally adjustable on the beam A by means of a suitable channel in bed of same, and lateral dovetail grooves sliding with its face flush with that of the beam. C is a cross-bar, rigidly attached to the left or inner extremity of the plate B, and serving as a finger-index to mark off the deduction required. D is the ordinary weighing-slide; but its face is provided with indices to correctly register the grain in question, as shown by the figures on the main plate B. The ordinary figures on a scale appear on the upper side *a* of the beam A, and are in any desired progression, as 1, 2, 3, or 10, 20, 30, &c. This may be called the "gross" column.

The central plate B has as its first row figures corresponding in progression to those of the gross column, and is called the "net" column, since it serves to show the weight of the article when the tare is taken from the gross. Next below this are two columns which answer to wheat, respectively in bushels and pounds, being obtained by dividing the net weight by the number of pounds (sixty) in a legal bushel of wheat. Then follow two other columns, which also give, respectively, in bushels and pounds, the amount of barley handled, being the net weight divided by forty-eight. Any number of such columns may be employed; and they may extend as far as there are differing varieties of grain. The weighing-slide D is as ordinarily used on scales, but its face is provided with any appropriate symbols or words to indicate the grain corresponding to the columns of bushels and pounds immediately on its left on the central plate B.

The operation is at once seen, and is as follows: A conveyance or car of any nature is run onto the scales, correctly weighed and memoranded; then, upon being unloaded, it is again weighed, which shows its own weight as it entered into the former gross weight. We will premise that six hundred and twenty pounds was the first balancing of the scale, for wagon, wheat, and all, and that one hundred and seventy is the second balance of all the former load, with the exception of the wheat. We therefore slide the plate B forward or outward until the index C notches at the number 170 on the beam; then, placing the slide D at the number (620) first given as the gross weight, we find that by running our eye vertically down the central plate B, immediately adjacent to the inner edge of the slide D, we have at once registered on the upper column of said plate the net weight, (four hundred and fifty pounds,) and below same the bushels (seven) and pounds (thirty) over a bushel which are in four hundred and fifty pounds of wheat. So we continue down and find the bushels and pounds in any other variety of grain at such a net weight of quantity; the tare being given and the gross being given, the net can at once be ascertained, and also the same reduced to the standard of market handling—to wit, bushels and pounds.

It is apparent that the scale-beam may carry the figures up into thousands or any desired altitude; also, the net column would thus correspondingly accompany in degree the scale-beam, and that the principle being once developed, as herein shown, it may be extended *ad infinitum*.

In construction of the calculator, it is immaterial to spirit of same what exact arrangement the several columns of figures may assume, provided the numerical proportions and mathematical symmetry be maintained. Thus the figures could be on the lower instead of upper side of the frame A, and the columns on plate B could be relatively changed, as well as the indices on cross-bar D, to correspond with such latter; but I prefer to have the parts arranged as here presented, both for nicety of operation and convenience in handling and reading same. A very convenient and suitable *vade mecum* is thus afforded for any business-desk having occasion for such calculations to be made; and it can be embodied in any agreeable form and style, so long as it incorporates the foregoing elements.

Having fully described my invention, what I claim as new, and desire to secure by Letters Patent, is—

1. A grain-calculator consisting of the weighing-beam and slide of any scales, in combination with the plate B, registered and indexed, substantially as and for the purpose set forth.

2. In a grain calculator, the combination, with a supporting-frame and a sliding central plate, of slides C and D, arranged relatively to the above-named frame and sliding plate, to register tare and gross weight, substantially as and for the purpose set forth.

In testimony that I claim the foregoing I have hereunto set my hand.

ORLANDO HUFFMAN.

Witnesses:
J. C. PANTER,
ROBT. CONNELL.